(12) United States Patent
Geliot et al.

(10) Patent No.: US 11,021,898 B2
(45) Date of Patent: Jun. 1, 2021

(54) AIRCRAFT BYPASS TURBOJET ENGINE WITH OPENING FITTED WITH A HINGE WITH GOOSENECK FITTING

(71) Applicant: Airbus Operations SAS, Toulouse (FR)

(72) Inventors: Jean Geliot, Toulouse (FR); Adeline Soulie, Verdun sur Garonne (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 280 days.

(21) Appl. No.: 16/293,164

(22) Filed: Mar. 5, 2019

(65) Prior Publication Data
US 2019/0284856 A1 Sep. 19, 2019

(30) Foreign Application Priority Data

Mar. 13, 2018 (FR) ..................................... 1852163

(51) Int. Cl.
*B64D 29/06* (2006.01)
*E05D 7/10* (2006.01)
(Continued)

(52) U.S. Cl.
CPC ............... *E05D 7/1066* (2013.01); *B64C 1/14* (2013.01); *B64D 29/06* (2013.01); *B64D 29/08* (2013.01);
(Continued)

(58) Field of Classification Search
CPC ........... E05D 7/1066; E05D 5/06; E05D 1/00; E05D 16/26; E05D 2005/067;
(Continued)

(56) References Cited

U.S. PATENT DOCUMENTS 2,763,900 A * 9/1956 McAfee ................ B64C 1/1407
49/70
3,907,224 A * 9/1975 Stearns ..................... F02K 1/58
244/110 B
(Continued)

FOREIGN PATENT DOCUMENTS

EP 0299856 A1 1/1989
EP 0317037 A2 5/1989
(Continued)

OTHER PUBLICATIONS

French Search Report; priority document.

*Primary Examiner* — Assres H Woldemaryam
(74) *Attorney, Agent, or Firm* — Greer, Burns & Crain, Ltd.

(57) ABSTRACT

A bypass turbojet engine comprising a fixed structure, a central core and a cowl comprising a fixed part and a mobile cowl mounted with the ability to rotate on the fixed structure between a closed position and an open position via hinges with gooseneck fitting. At least one hinge with gooseneck fitting comprises a gooseneck fitting having one end mounted in articulated manner on the mobile cowl and one end mounted in an articulated manner on the fixed structure, the bypass turbojet engine comprises anti-vibration means which are configured to exert pressure against the gooseneck fitting when the mobile cowl is in the closed position.

5 Claims, 2 Drawing Sheets

(51) Int. Cl.
  *B64C 1/14* (2006.01)
  *B64D 29/08* (2006.01)
  *E05D 5/06* (2006.01)

(52) U.S. Cl.
  CPC .......... *E05D 5/06* (2013.01); *E05D 2005/067* (2013.01); *E05Y 2900/502* (2013.01)

(58) Field of Classification Search
  CPC ........ B64D 29/00; B64D 29/06; B64D 29/08; B64D 27/26; B64D 27/18; B64D 2027/266; B64C 1/14; E05Y 2900/502
  See application file for complete search history.

(56) References Cited

U.S. PATENT DOCUMENTS

| | | | |
|---|---|---|---|
| 4,854,010 A * | 8/1989 | Maraghe | B64C 1/1407 16/360 |
| 6,155,520 A | 12/2000 | Giraud et al. | |
| 8,661,667 B2 | 3/2014 | Bogue et al. | |
| 9,650,917 B2 | 5/2017 | Stewart et al. | |
| 9,758,234 B2 | 9/2017 | Harding et al. | |
| 9,873,504 B2 * | 1/2018 | Aten | F01D 25/24 |
| 2003/0151261 A1 * | 8/2003 | Porte | B64D 29/06 292/229 |
| 2006/0061108 A1 | 3/2006 | Meineke et al. | |
| 2017/0174352 A1 * | 6/2017 | Gonzalez Prieto | B64D 29/06 |
| 2017/0174354 A1 | 6/2017 | Ciprian | |
| 2018/0216379 A1 * | 8/2018 | Spoelstra | E05D 3/14 |

FOREIGN PATENT DOCUMENTS

| | | |
|---|---|---|
| EP | 2336030 A2 | 6/2011 |
| EP | 2862805 A1 | 4/2015 |
| EP | 3042845 A1 | 7/2016 |
| FR | 2768489 A1 | 3/1999 |
| WO | 2012037988 A1 | 3/2012 |

* cited by examiner

AIRCRAFT BYPASS TURBOJET ENGINE WITH OPENING FITTED WITH A HINGE WITH GOOSENECK FITTING

CROSS-REFERENCES TO RELATED APPLICATIONS

This application claims the benefit of the French patent application No. 1852163 filed on Mar. 13, 2018, the entire disclosures of which are incorporated herein by way of reference.

FIELD OF THE INVENTION

The present invention relates to a bypass turbojet engine for an aircraft, the bypass turbojet engine comprising a cowl mounted with the ability to rotate with respect to a fixed structure on hinges with gooseneck fitting. The present invention also relates to an aircraft comprising at least one such bypass turbojet engine.

BACKGROUND OF THE INVENTION

An aircraft conventionally comprises at least one wing under which is fixed a pylon to which a bypass turbojet engine is attached.

A bypass turbojet engine of the prior art comprises a central core constituting the engine with a combustion chamber, a fan, which is at the front of the central core and an inner cowl which constitutes the interior wall of a secondary (bypass) flow path and which extends round the central core, and an outer cowl which constitutes the exterior wall of the secondary (bypass) flow path and which extends around the inner cowl.

In order to allow maintenance to be carried out on the bypass turbojet engine, the inner cowl and the outer cowl each comprise at least one cowl which is mounted such that it can rotate on a fixed structure of the turbojet engine via hinges.

The inner cowl thus has a fixed part secured to the fixed structure and a mobile cowl. The fixed part has a first edge and the mobile cowl has a second edge. When the mobile cowl is in the closed position, the second edge extends along the first edge and the mobile cowl prolongs the fixed part so as to form a continuous surface in order to ensure airtightness. When the mobile cowl is in the open position, the second edge is faced away from the first edge and the mobile cowl is faced away from the fixed part towards the outside.

Regarding the mobile cowl, it is desirable for its hinges not to influence the flow of air along the secondary (bypass) flow path. For that purpose they are hidden on the side of the central core. Furthermore, because of the presence of the first edge, each hinge needs to adopt a shape that allows it to pass around the first edge. Because of the various constraints, each hinge adopts the shape of a gooseneck.

While these hinges with gooseneck fittings allow good air flow to be achieved, the gooseneck fittings which are articulated at their two ends may vibrate when the mobile cowl is in the closed position.

SUMMARY OF THE INVENTION

It is an object of the present invention to propose a bypass turbojet engine that has a cowl with a cowl mounted with the ability to rotate via at least one hinge with gooseneck fitting that comprises means to prevent the gooseneck fitting from vibrating.

To this end, the proposal is for a bypass turbojet engine for an aircraft, the bypass turbojet engine comprising:

a fixed structure, a central core constituting the engine, a cowl which constitutes a wall of a secondary (bypass) flow path extending around the central core, the cowl comprising a fixed part secured to the fixed structure and a mobile cowl mounted with the ability to rotate on a fixed structure via at least one hinge with gooseneck fitting, between an open position and a closed position, at least one of the at least one hinges with gooseneck fitting comprising a gooseneck fitting having one end mounted in an articulated manner on the mobile cowl and one end mounted in an articulated manner on the fixed structure, the bypass turbojet engine being characterized in that, for the or each gooseneck fitting, the bypass turbojet engine comprises anti-vibration means which are configured to exert pressure against the gooseneck fitting when the mobile cowl is in the closed position.

The presence of the anti-vibration means prevents the gooseneck fitting from vibrating when the mobile cowl is in the closed position.

Advantageously, the anti-vibration means comprise a clip fixed to the fixed structure and a tab secured to the gooseneck fitting, and the tab positions itself between two branches when the mobile cowl is in the closed position and exits the clip when the mobile cowl leaves the closed position.

Advantageously, the anti-vibration means adopts the shape of a spring leaf bent into an L-shape, a first end of which is fixed to the fixed structure and a second end of which is free, the second end rests against the gooseneck fitting when the mobile cowl is in closed position, and the gooseneck fitting is not in contact with the spring leaf when the mobile cowl leaves the closed position.

Advantageously, the bypass turbojet engine comprises a protective pad affixed against the surface of the gooseneck fitting against which the spring leaf rubs.

According to one particular embodiment, the cowl is an inner cowl which constitutes an interior wall of the secondary (bypass) flow path.

According to another particular embodiment, the cowl is an outer cowl which constitutes an exterior wall of the secondary (bypass) flow path.

The invention also proposes an aircraft comprising at least one bypass turbojet engine according to one of the above alternative forms.

BRIEF DESCRIPTION OF THE DRAWINGS

The aforementioned features of the invention, together with others, will become more clearly apparent from the reading the following description of one exemplary embodiment, the description being given in connection with the attached drawings among which.

DETAILED DESCRIPTION OF THE PREFERRED EMBODIMENTS

Figure 1:
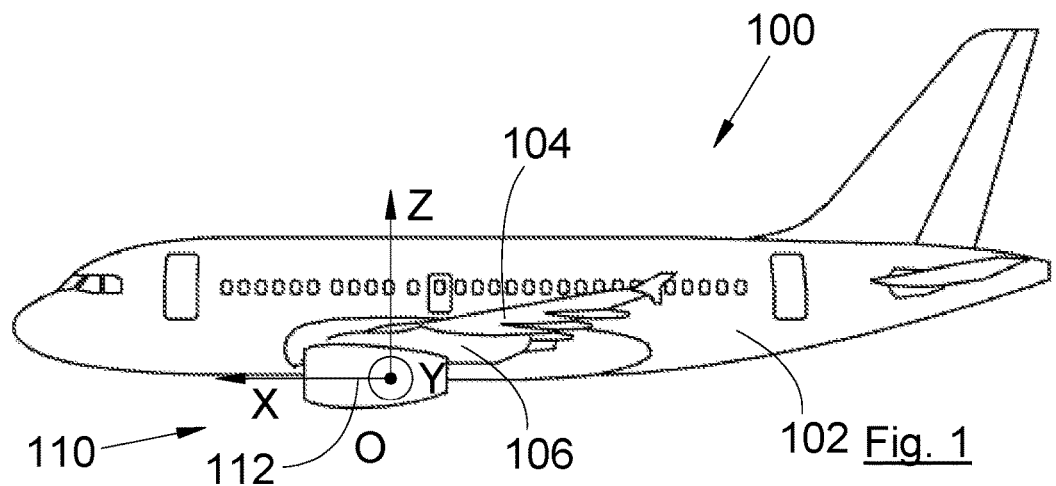
FIG. 1 is a side view of an aircraft having at least one bypass turbojet engine according to the invention.

In the description which follows, terms relating to a position are considered with reference to an aircraft in the normal position of forward travel, namely as depicted in FIG. 1.

FIG. 1 shows an aircraft 100 which comprises a fuselage 102 having a wing 104 on each side. At least one bypass turbojet engine 110 is fixed by means of a pylon 106 under each wing 104.

Throughout the description which follows, by convention, the direction X corresponds to the longitudinal direction of the bypass turbojet engine 110, this direction being parallel to the longitudinal axis of the bypass turbojet engine 110. Furthermore, the direction Y corresponds to the direction oriented transversely with respect to the bypass turbojet engine 110, and the direction Z corresponds to the vertical direction or the height, these three directions X, Y, and Z being mutually orthogonal.

Figure 2:
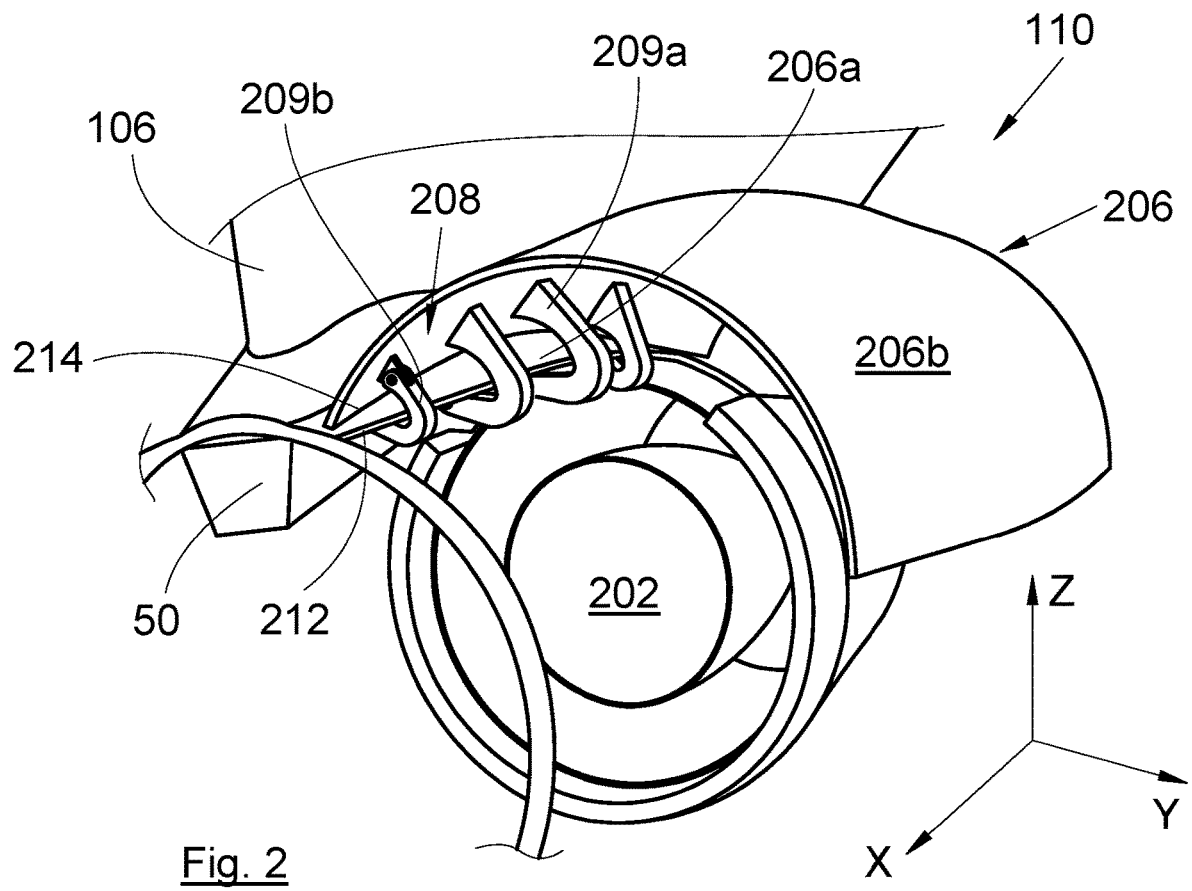
FIG. 2 is a perspective view from the front of a bypass turbojet engine having a mobile cowl in the open position and mounted on hinges with gooseneck fittings according to the invention.

FIG. 2 shows the bypass turbojet engine 110, the makeup of which is similar to that of the bypass turbojet engine of the prior art, and which comprises a central core 202 constituting the engine with a combustion chamber, a fan and an inner cowl 206 which constitutes the interior wall of a secondary (bypass) flow path extending around the central core 202.

The bypass turbojet engine 110 also comprises an outer cowl 112 visible in FIG. 1 which constitutes the exterior wall of the secondary (bypass) flow path and which extends around the inner cowl 206.

Conventionally, the outer cowl 112 is mounted with the ability to rotate on the pylon 106 or on a fixed structure 50 of the bypass turbojet engine 110 via hinges.

The inner cowl 206 comprises a fixed part 206a which is secured to a fixed structure 50 of the bypass turbojet engine 110, and a mobile cowl 206b which is mounted with the ability to rotate on the fixed structure 50 of the bypass turbojet engine 110 via at least one hinge with gooseneck fitting 208. The axis of rotation of the mobile cowl 206b and therefore of the hinges with gooseneck fitting 208 is parallel overall to the longitudinal direction X. Each hinge with gooseneck fitting 208 here comprises a gooseneck fitting 209a-b.

The fixed part 206a has a first edge 212 and the mobile cowl 206b has a second edge 214. When the mobile cowl 206b is in the closed position, the second edge 214 extends against the first edge 212 and the mobile cowl 206b prolongs the fixed part 206a to form a continuous surface. When the mobile cowl 206b is in the open position, the second edge 214 is faced away from the first edge 212 and the mobile cowl 206b is faced away from the fixed part 206a towards the outside, namely across the secondary (bypass) flow path and permits access to the inside of the central core 202.

In the embodiment of the invention depicted in FIG. 2, there is a first type of gooseneck fitting 209a and a second type of gooseneck fitting 209b, and each gooseneck fitting 209a-b takes the overall shape of a C.

The gooseneck fitting 209a of the first type comprises one end which is rigidly secured to the mobile cowl 206b and another end which is mounted in an articulated manner on the fixed structure 50 and under the fixed part 206a, namely on the opposite side to the secondary (bypass) flow path.

The gooseneck fitting 209b of the second type comprises one end which is mounted in an articulated manner to the mobile cowl 206b and another end which is mounted in an articulated manner on the fixed structure 50 and under the fixed part 206a, namely on the opposite side to the secondary (bypass) flow path. The gooseneck fitting 209b of the second type with two articulations allows the mobile cowl 206b a certain degree of travel during maneuvering.

Each articulation of the gooseneck fitting 209a-b is achieved by means of a pivot connection which is, for example, in the form of a clevis.

Figure 3:
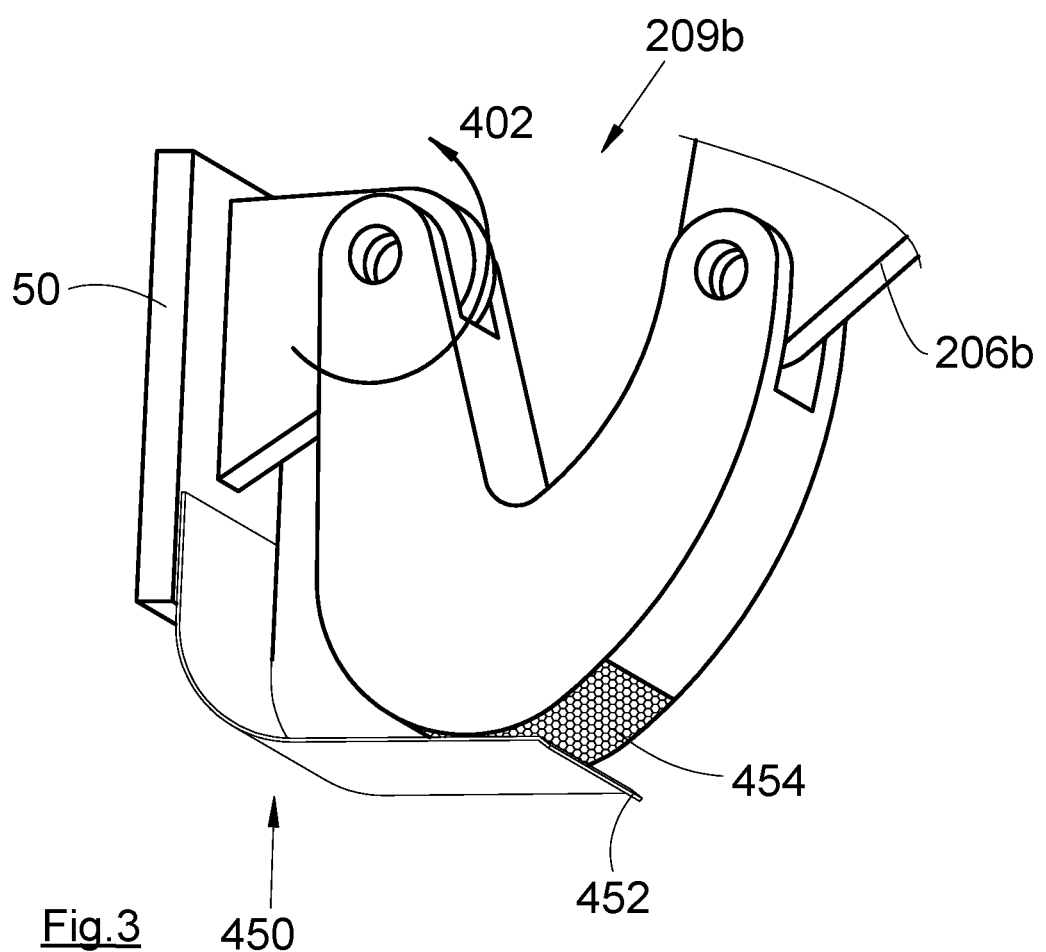
FIG. 3 is a side view of a hinge with gooseneck fitting according to an embodiment of the invention.

FIG. 3 shows a gooseneck fitting 209b of the second type when the mobile cowl 206b is in the closed position. The arrow 302 embodies the rotation of the gooseneck fitting 209b of the second type during the opening of the mobile cowl 206b.

FIG. 3 shows a gooseneck fitting 209b of the second type when the mobile cowl 206b is in the closed position. The arrow 402 embodies the rotation of the gooseneck fitting 209b of the second type during the opening of the mobile cowl 206b.

The bypass turbojet engine 110 has anti-vibration means 450 which prevent the gooseneck fitting 209b of the second type from vibrating when the mobile cowl 206b is in the closed position. The anti-vibration means 450 are thus designed to exert pressure against the gooseneck fitting 209b of the second type in order to immobilize it.

FIG. 3 shows anti-vibration means 450 according to an embodiment.

The anti-vibration means 450 according to the illustrated embodiment take the form of a spring leaf bent into an L-shape a first end of which is fixed to the fixed structure 50 and a second end of which is free. The spring leaf is positioned in such a way that the second end rests against the gooseneck fitting 209b when the mobile cowl 206b is in the closed position and so that the gooseneck fitting 209b is not in contact with the spring leaf when the mobile cowl 206b leaves the closed position.

When the mobile cowl 206b is in the closed position, the gooseneck fitting 209b forces against the second end so as to move it away from its rest position and place it under strain.

To make it easier for the spring leaf to part as the gooseneck fitting 209b approaches, the second end has an inclined plane 452 oriented towards the outside.

In order to protect that surface of the gooseneck fitting 209b against which the spring leaf rubs, a protective pad 454, for example made of Teflon, is affixed against this surface.

The invention has been more particularly described in the case of an inner cowl constituting an interior wall of the secondary (bypass) flow path but could apply likewise to an outer cowl constituting an exterior wall of the secondary (bypass) flow path.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bypass turbojet engine for an aircraft, the bypass turbojet engine comprising:
   a fixed structure,
   a central core constituting the engine and comprising a primary flow path,
   a cowl which constitutes a wall of a secondary flow path extending around the central core, the cowl comprising a fixed part secured to the fixed structure and a mobile cowl mounted with an ability to rotate on the fixed structure via at least one hinge with a gooseneck fitting, between an open position and a closed position, at least one of said at least one hinges with a gooseneck fitting comprising a gooseneck fitting having one end mounted in an articulated manner on the mobile cowl and one end mounted in an articulated manner on the fixed structure,
   wherein, for the gooseneck fitting of the at least one hinge, the bypass turbojet engine comprises anti-vibration means configured to exert pressure against the gooseneck fitting when the mobile cowl is in the closed position, and
   wherein the anti-vibration means adopts a shape of a spring leaf bent into an L-shape, a first end of which is fixed to the fixed structure and a second end of which is free, wherein the second end rests against the gooseneck fitting when the mobile cowl is in the closed position, and wherein the gooseneck fitting is not in contact with the spring leaf when the mobile cowl leaves the closed position.

2. The bypass turbojet engine according to claim 1, further comprising a protective pad affixed against a surface of the gooseneck fitting against which the spring leaf rubs.

3. The bypass turbojet engine according to claim 1, wherein the cowl is an inner cowl which constitutes an interior wall of the secondary flow path.

4. The bypass turbojet engine according to claim 1, wherein the cowl is an outer cowl which constitutes an exterior wall of the secondary flow path.

5. An aircraft comprising at least one bypass turbojet engine according to claim 1.

* * * * *